United States Patent
Eversdijk

(10) Patent No.: US 10,745,178 B2
(45) Date of Patent: Aug. 18, 2020

(54) DEVICE AND METHOD FOR STORAGE AND TRANSPORTATION OF AN EMPTY CASE OF A FIREARM BULLET CARTRIDGE FOR FORENSIC INVESTIGATION

(71) Applicant: Martin Jan Peter Eversdijk, Nieuw Vennep (NL)

(72) Inventor: Martin Jan Peter Eversdijk, Nieuw Vennep (NL)

( * ) Notice: Subject to any disclaimer, the term of this patent is extended or adjusted under 35 U.S.C. 154(b) by 288 days.

(21) Appl. No.: 15/548,394

(22) PCT Filed: Feb. 4, 2015

(86) PCT No.: PCT/EP2015/052240
§ 371 (c)(1),
(2) Date: Aug. 2, 2017

(87) PCT Pub. No.: WO2016/124229
PCT Pub. Date: Aug. 11, 2016

(65) Prior Publication Data
US 2017/0341815 A1    Nov. 30, 2017

(51) Int. Cl.
*B65D 25/10* (2006.01)
*B65D 51/16* (2006.01)
(Continued)

(52) U.S. Cl.
CPC .......... *B65D 25/101* (2013.01); *B01L 3/508* (2013.01); *B01L 9/50* (2013.01); *B65B 7/2835* (2013.01);
(Continued)

(58) Field of Classification Search
CPC ............ B01L 2300/0609; B01L 3/508; B01L 3/5083; B01L 3/50825; B01L 9/50;
(Continued)

(56) References Cited

U.S. PATENT DOCUMENTS

| 2,975,467 A | 3/1961 | Victor |
| 4,094,641 A * | 6/1978 | Friswell ................. B01L 3/508 |
| | | 215/12.1 |

(Continued)

FOREIGN PATENT DOCUMENTS

| DE | 212004000062 U1 | 7/2006 |
| DE | 102010049390 B3 | 2/2012 |
| WO | 9944908 A1 | 9/1999 |

OTHER PUBLICATIONS

International Search Report and Written Opinion dated Sep. 30, 2015 in International Patent Application No. PCT/EP2015/052240, 10 pages.

*Primary Examiner* — Mollie Impink
(74) *Attorney, Agent, or Firm* — Shook, Hardy & Bacon L.L.P.

(57) ABSTRACT

A device for storage and transportation of an empty case of a firearm bullet cartridge for forensic investigation, wherein said case comprises a cylindrical shell which is substantially closed at one end, said device comprising a container having a bottom wall, a side wall and an opening, and comprising a cap for sealing the opening of said container, wherein said cap is provided with holding means arranged to be inserted in the empty case for restricting lateral movement of the empty case in said container.

19 Claims, 1 Drawing Sheet

(51) Int. Cl.
*B65D 51/26* (2006.01)
*B01L 3/00* (2006.01)
*B01L 9/00* (2006.01)
*B65D 77/04* (2006.01)
*B65B 7/28* (2006.01)
*B65D 41/04* (2006.01)
*G01N 1/00* (2006.01)

(52) U.S. Cl.
CPC ......... *B65D 41/04* (2013.01); *B65D 51/1616* (2013.01); *B65D 51/26* (2013.01); *B65D 77/0493* (2013.01); *B01L 2200/141* (2013.01); *B01L 2200/18* (2013.01); *B01L 2300/042* (2013.01); *B01L 2300/048* (2013.01); *B01L 2300/0609* (2013.01); *B01L 2300/0681* (2013.01); *B01L 2300/0832* (2013.01); *B01L 2300/0851* (2013.01); *B01L 2300/0858* (2013.01); *G01N 2001/005* (2013.01)

(58) Field of Classification Search
CPC .. B65D 25/101; B65D 51/26; A61B 10/0096; G01N 2001/002; G01N 2001/005; G01N 2001/007
See application file for complete search history.

(56) References Cited

U.S. PATENT DOCUMENTS

| | | | |
|---|---|---|---|
| 4,717,032 A * | 1/1988 | Wu | A45D 40/265 215/228 |
| 5,494,646 A * | 2/1996 | Seymour | A61B 5/411 422/401 |
| 7,429,141 B2 * | 9/2008 | Habatjou | A46B 5/005 401/126 |
| 2003/0021736 A1 | 1/2003 | Kang et al. | |
| 2005/0106750 A1 | 5/2005 | Tung et al. | |

* cited by examiner

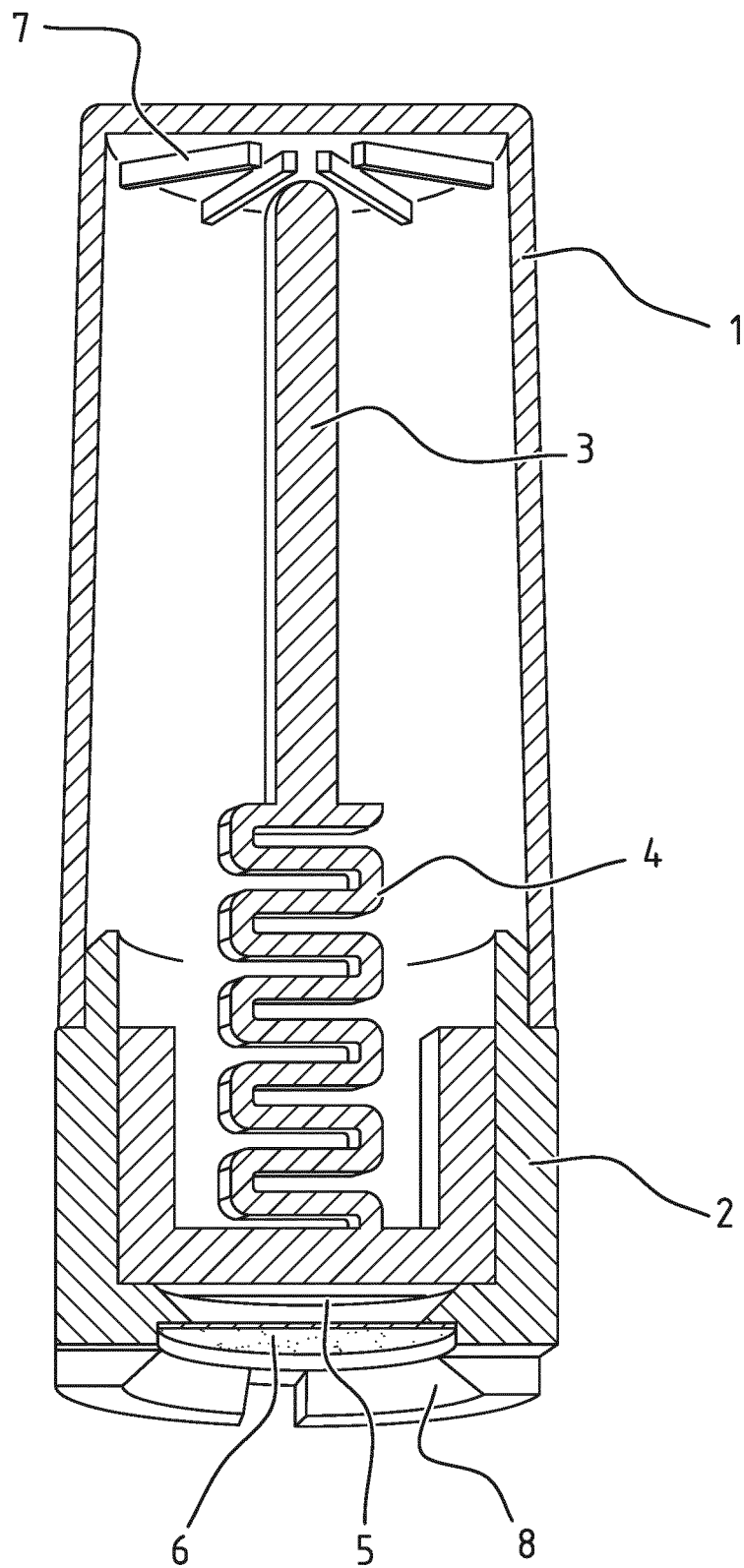

DEVICE AND METHOD FOR STORAGE AND TRANSPORTATION OF AN EMPTY CASE OF A FIREARM BULLET CARTRIDGE FOR FORENSIC INVESTIGATION

CROSS-REFERENCE TO RELATED APPLICATIONS

This application claims priority under 35 U.S.C. § 365 to PCT/EP2015/052240, filed on Feb. 4, 2015, entitled "DEVICE AND METHOD FOR STORAGE AND TRANSPORTATION OF AN EMPTY CASE OF A FIREARM BULLET CARTRIDGE FOR FORENSIC INVESTIGATION," the entirety of the aforementioned applications is incorporated by reference herein.

The invention relates to a device for storage and transportation of an empty case of a firearm bullet cartridge for forensic investigation, wherein said case comprises a cylindrical shell which is substantially closed at one end, said device comprising a container having a bottom wall, a side wall and an opening, and comprising a cap for sealing the opening of said container.

Such a device is known. The known device is used inter alia in the case of criminal offences involving shooting of firearms for collecting the empty case of a bullet found at the site where the criminal offense has been committed. This is done by removing the cap from the sterile container, picking up the empty case and subsequently placing it back in the tubular container. The sealed container is then transported to a laboratory, where the empty case is examined for, for instance, propellant traces and indications of mechanical impact form the firearm from which it is fired.

The object of the invention is to provide a device of the above kind which reduces the risk of contamination or wiping off of the traces on the empty case, which reduces the risk of further mechanical impact on the empty case, which is easier to work with, which requires fewer external provisions, and/or which reduces the risk of mistakes being made.

In order to accomplish that object, said cap is provided with holding means arranged to be inserted in the empty case for restricting lateral movement of the empty case in said container. In one embodiment said holding means comprise a pin. In that manner the empty case is restricted in lateral movement, whereby it cannot touch the wall of the container, provided the diameter of the container is large enough. In another embodiment said holding means comprise clamping means for clamping the closed end of said empty case against the bottom wall of the container. In that manner the closed end of said empty case can be clamped against the bottom wall of the container when the cap is attached to the container, such that it cannot move and whereby the wall of the case cannot touch the wall of the container.

Said pin preferably extends from the centre of said cap. Furthermore said pin is preferably provided with a resilient part, for pushing the case against the end wall of the container. Said resilient part preferably comprises a spring. Said resilient part or spring is preferably compressible by at least 3 mm, more preferably at least 5 mm. Preferably said spring extends form the cap and the pin extends from the spring.

The container is preferably provided with at least one ventilating hole provided with filter means that shut off the interior of the container from contamination from the environment. Said ventilating hole is preferably provided in the cap. Said bottom wall of said container is preferably provided with ribs for maintaining a distance between the surface of said bottom wall and the closed end of the empty case. Alternatively, a moist absorbing material such as silicone grains can be inserted in the container when using the device.

Said cap is preferably provided with ribs on its outer end wall for maintaining a distance between the ventilating hole and a surface on which the outer end wall of the cap is placed.

The container is preferably a tubular container. Said cap is preferably provided with screw thread for fixing the cap to the container. The container preferably has a length of 3-5 cm, more preferably 3.5-4.5 cm. Preferably the container has a diameter of 2-3 cm, more preferably 2.3-2.8 cm. Said pin preferably has a diameter of 0.3-0.4 cm, more preferably 0.33-0.37 cm. In the preferred embodiment the distance between the outer side surface of the pin and the inner surface of the side wall extending on the opposite side of the pin is 0.8-1.7 cm, preferably 0.9-1.5 cm, more preferably 1.1-1.4 cm. By choosing said dimensions the device is suitable for empty cases of the most regular firearm bullet cartridges (for instance .45 caliber firearm bullet cartridges, of which the inner case diameter is 1.16 cm), such that they cannot touch the inner surface of the side wall of the container. Larger dimensions for larger calibers are of course possible.

The invention also relates to a method for storage and transportation of an empty case of a firearm bullet cartridge for forensic investigation, wherein said case comprises a cylindrical shell which is substantially closed at one end, said wherein device comprising a container having a bottom wall, a side wall and an opening is used, and wherein a cap is attached to the container for sealing the opening of said container, wherein that said cap is provided with holding means which are inserted in the empty case, which restrict lateral movement of the empty case in said container when the cap is attached to the container.

The invention will now be explained in more detail in by means of a preferred embodiment as shown in the FIGURE, in which a longitudinal cross section of the device according to the invention is shown.

The device for storage and transportation of an empty case of a firearm bullet cartridge for forensic investigation that is shown in the FIGURE comprises a tubular container 1, which is made for instance of a transparent plastic material, and a cap 2, which is in principle capable of sealing the container 1 at one end. A pin 3 is attached to the inner centre of the end wall of cap 2 by means of a compressible spring 4. The cap 2 is provided with screw thread such that is can be screwed into the container 1. Alternative closure methods, such as by clamp or snap means, are of course possible. In the closed condition the pin 3 with the empty case push against the inner side of the bottom wall of the container 1, in particular against ribs 7 provided thereon. In this embodiment the ribs 7 extending in radial direction from the centre of the bottom wall. Thereby the empty shell cannot move when being transported.

The container is provided with a ventilating opening 5, which in this embodiment is located in the outer end wall of the cap 2. The ventilating opening 5 is covered by a filter 6, which allows moist to exit the container, but block anything else to pass, in particular skin cells. The end wall of cap 2 is partially open to allow air and moist to pass through the opening 5 and filter 6. The outer side of the end wall of cap 2 is provide with ribs 8, in order to allow air and moist to pass through to the environment when the cap is placed on a surface.

The most relevant dimensions of this preferred embodiment are as follows. The inner length of the container 1 is 5 cm, the inner diameter of the container 1 is 2.6 cm, the length of the pin 3 (measured from the outer end of the spring 4) is 3.5 cm, and the diameter of the pin 3 is 0.35 cm. This preferred embodiment is therefore especially suited for up to .45 caliber firearm bullet cartridges, of which the case diameter is 1.1 cm. Larger dimensions for larger calibers are of course possible.

In use, for example at the site where a criminal offense involving a shooting has been committed the cap 2 with pin 3 is removed from the container, and the pin 3 is inserted in the opening of the empty shell such that it can be lifted from the ground without touching the shell. Subsequently the cap 2 with the empty case on the pin 3 is inserted into the container 1 and the cap 2 is screwed onto the container, whereby the empty case is immobilized by clamping the end wall thereof against the ribs 7. Any moisture contained in or on the empty case can subsequently evaporate and exit the container via the filter 6 in ventilating hole 5.

The invention has thus been described by means of a preferred embodiment. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein.

The invention claimed is:

1. A method for storage and transportation of an empty case of a firearm bullet cartridge for forensic investigation, the method comprising:
   providing a case of a firearm bullet cartridge comprising a cylindrical shell which is substantially closed at one end;
   providing a container having a bottom wall, a side wall and an opening;
   providing a cap for sealing the opening of the container, wherein the cap includes a holding element; and
   attaching the cap to the container, wherein the holding element is designed such that the holding element restricts lateral movement of the case in the container when the cap is attached to the container.

2. The method of claim 1, wherein the holding element comprises a pin.

3. The method of claim 2, wherein the pin has a diameter of 0.3-0.4 cm.

4. The method of claim 2, wherein a distance between an outer side surface of the pin and an inner surface of the side wall of the container is 0.8-1.7 cm.

5. The method of claim 1, wherein the holding element comprises a clamping element for clamping the closed end of the case against the bottom wall of the container.

6. The method of claim 5, wherein the clamping element includes a pin which is arranged to be inserted into the case, and wherein the pin is arranged to be pushed against the bottom wall.

7. The method of claim 6, wherein the pin extends from a center of the cap.

8. The method of claim 7, wherein the pin is coupled to a resilient part.

9. The method of claim 8, wherein the resilient part comprises a spring.

10. The method of claim 9, wherein the resilient part is compressible by at least 3 mm.

11. The method of claim 10, wherein the resilient part extends from the cap and the pin extends from the resilient part.

12. The method of claim 1, wherein the container is provided with at least one ventilating hole with a filter that shuts off an interior of the container from contamination from the environment.

13. The method of claim 1, wherein the cap is provided with at least one ventilating hole with a filter that shuts off an interior of the container from contamination from the environment.

14. The method of claim 13, wherein the cap is provided with ribs on its outer end wall for maintaining a distance between the ventilating hole and a surface on which the outer end wall of the cap is placed.

15. The method of claim 1, wherein the container is a tubular container.

16. The method of claim 1, wherein the cap is provided with a screw thread for fixing the cap to the container.

17. The method of claim 1, wherein the container has a length of 3-5 cm.

18. The method of claim 1, wherein the container has a diameter of 2-3 cm.

19. The method of claim 1, wherein the bottom wall of the container is provided with ribs for maintaining a distance between a surface of the bottom wall and the closed end of the case.

* * * * *